United States Patent [19]

Silverglate

[11] Patent Number: 4,534,614
[45] Date of Patent: Aug. 13, 1985

[54] ASPHERICAL LENS FOR CONCENTRATING DIFFUSE OPTICAL RADIATION

[75] Inventor: David E. Silverglate, Santa Cruz, Calif.

[73] Assignee: Plantronics, Inc., Santa Cruz, Calif.

[21] Appl. No.: 165,070

[22] Filed: Jul. 1, 1980

[51] Int. Cl.³ ............................................. G02B 13/14
[52] U.S. Cl. ....................................... 350/1.4; 350/432
[58] Field of Search .................. 350/441, 432, 1.7, 1.4, 350/431, 434, 435; 356/134; 333/12

[56] References Cited

U.S. PATENT DOCUMENTS

| | | | |
|---|---|---|---|
| 2,416,525 | 2/1947 | Jeffree | 350/432 |
| 2,637,242 | 5/1953 | Osterberg et al. | 350/432 |
| 3,109,097 | 10/1963 | Waard et al. | 350/1.4 |
| 3,368,078 | 2/1968 | Flint et al. | 350/409 |
| 3,397,314 | 8/1968 | Weiner | 350/1.4 |
| 3,774,039 | 11/1973 | Price | 250/552 |
| 3,886,544 | 5/1975 | Norodny | 350/432 |
| 4,262,365 | 4/1981 | George | 333/12 |

FOREIGN PATENT DOCUMENTS

| | | | |
|---|---|---|---|
| 943577 | 10/1948 | France | 350/432 |
| 0130047 | 10/1979 | Japan | 350/432 |
| 421971 | 9/1974 | U.S.S.R. | 350/160 LC |

OTHER PUBLICATIONS

Jenkins et al., *Fundamentals of Optics*, p. 6, McGraw-Hill, 3rd Edition, 1957.
Reale, C., "Metallic Films Coated with Dielectric Layers", Manufacturing Optics International, vol. 22, No. 1, Jul. 1969, pp. 1–14.
Griese, "Conference Systems Using I-R-Light Techniques", Journal of the Audio Engineering Society, vol. 27, No. 6, pp. 503–505, Jun. 1979.
*Electronics*, "Data-Input Link Goes Infrared for Process-Control Applications", pp. 60–62, Dec. 20, 1979.
Gfeller et al., "Wireless In-House Data Communication via Diffuse Infrared Radiation", Proceedings of the IEEE, vol. 67, No. 11, pp. 1474–1486, Nov. 1979.

Primary Examiner—Bruce Y. Arnold
Attorney, Agent, or Firm—Arnold, White & Durkee

[57] ABSTRACT

Optical signal detection apparatus suitable for use in diffuse infrared light wave communication comprises an aspherical lens in combination with a photodetector. The lens comprises a body of light transparent material having a planar back surface and an aspherical front surface. The front surface is of a shape approximating a hyperboloid. A light transparent, electrically conductive coating is applied to the planar back surface of the lens, and an optical filter is disposed between the lens and the photodetector.

4 Claims, 7 Drawing Figures

ASPHERICAL LENS FOR CONCENTRATING DIFFUSE OPTICAL RADIATION

BACKGROUND OF THE INVENTION

The present invention relates to optical radiation detection apparatus; and more particularly, it relates to optical signal detection apparatus for use in diffuse infrared light wave communication of information.

Modern semiconductor technology has provided light source devices, such as light emitting diodes, which can be accurately controlled by a driving electrical signal to produce modulated light. There has also been provided by this technology photodetector devices, such as photodiodes and phototransistors, which generate an electrical signal in response to light incident upon a receiving surface thereof. The advent of such light source and photodetector devices has given rise to the use of light as a transmission medium for intelligence. In particular, infrared light wave communication is finding rapid development.

In communicating intelligence via a diffuse infrared communication link, infrared light, the intensity of which has been modulated, is emitted from a source omnidirectionally to diffuse throughout the bounding enclosure, typically the inside of a room. The emitted light diffuses by uncollimated spread of the beam and also by reflection off boundary surfaces, such as walls, floor, ceiling, furniture, etc.

The amplitude of the electrical signal generated by a photodetector device is a function of the total optical power incident on the receiving surface of the device. Incident optical power is itself a function of both the area of the receiving surface and the field of view of the device. Reasonably priced photodetector devices have a small receiving surface. Furthermore, the photodetector devices have a narrow field of view, with electrical signal amplitude falling off dramatically at wide angles of light incidence.

Thus, in diffuse optical channels, as encountered in infrared light wave communication, the total optical power received and converted into the electrical output signal is but a very small portion of the transmitted infrared light. To obtain a suitable electrical output signal for processing by an electronic receive circuit, an optical signal of high power must be emitted or the communication range be limited.

Of further consideration in infrared light wave communication is the introduction of noise in the optical channel by reason of exposure of the photodetector to ambient light. Ambient light sources, such as daylight and tungsten or fluorescent lamps, include components within their spectrum which generate shot noise in the photodetector. To compensate for ambient light shot noise, a higher optical power input to the photodetector is required.

SUMMARY OF THE INVENTION

Applicant has found that optical gain for a diffuse light signal and an increase in the signal-to-noise ratio of optical signal detection apparatus are obtained by utilizing an aspherical lens in combination with a photodetector device. Increases in effective photodetector sensitivity and signal-to-noise ratio result by increased concentration of a diffuse optical signal on the receiving surface of the photodetector. In particular, the gain of optical signal detection apparatus is increased at very wide receiving angles.

In accordance with the present invention, the aspherical lens comprises a body of light transparent material having front and back surfaces, the back surface being planar and the front surface being aspherical. Preferably, the front surface is hyperboloidal, or a shape approximating a hyperboloid. In one suitable version of such a lens, the planar back surface is configured as a circular base, and the front surface is configured as a frustum of a right circular cone over an aft portion and configured as a spherical sector over a nose portion.

Further in accordance with the present invention, the aspherical lens may be provided with a light transparent, electrically conductive coating on at least the planar back surface. In addition, an optical filter may be disposed between the lens and the photodetector receiving surface.

In one embodiment of optical signal detection apparatus in accordance with the present invention, the photodetector receiving surface is encapsulated within the aspherical lens. In another embodiment, the photodetector receiving surface is disposed externally and adjacent the planar back surface of the lens. In an embodiment having the photodetector receiving surface encapsulated within the lens, an optical filter may also be encapsulated within the lens and disposed adjacent the photodetector receiving surface.

In accordance with another aspect of the present invention, the structure of an aspherical lens for concentrating diffuse optical radiation comprises a shell of light transparent material having an open internal void. The exterior of the shell is configured in an aspherical shape over a front surface portion. Light transparent filler material is placed inside the shell to fill the internal void thereof and define a planar back surface.

Alternatively, the structure of an aspherical lens for concentrating diffuse optical radiation may comprise a solid body of light transparent material configured in an aspherical shape over a front surface portion and being truncated at the rear to define a planar back surface.

In either case, the lens system as described may further include a light transparent, electrically conductive coating applied to the planar back surface. Furthermore, an optical filter may be disposed adjacent the planar back surface, and positioned so as to overlay at least a portion of the transparent conductive coating.

BRIEF DESCRIPTION OF THE DRAWINGS

A written description setting forth the best mode presently known for carrying out the present invention, and of the manner of implementing it and using it, is provided by the following detailed description of a preferred embodiment which is illustrated in the attached drawings wherein.

DETAILED DESCRIPTION OF PREFERRED EMBODIMENTS

Figure 1:
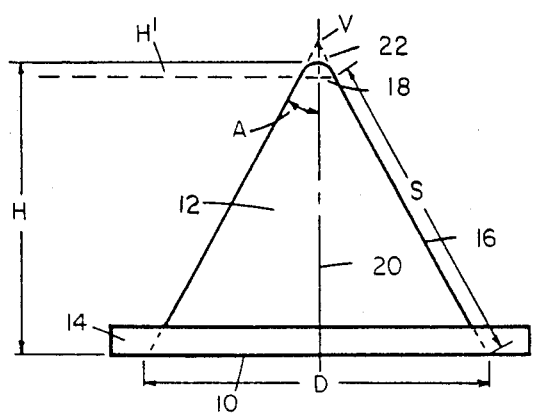
FIG. 1 is a side view of a lens in accordance with the present invention.

Referring now to FIG. 1 of the drawings, an aspherical lens for concentrating diffuse light is shown. The lens comprises a body of light transparent material, such as polycarbonate. The body of material is configured to have a planar back surface 10 and an aspherical front surface 12. The front surface, projecting from the plane of the back surface, refracts diffuse light impinging thereon toward the planar back surface and concentrates diffuse light, such as an infrared light wave communication signal.

Optimally, the front surface is in the shape of a hyperboloid. However, a shape approximating a hyperboloid is suitable. For example, and as shown, a substantially conically-shaped front surface 12 is suitable.

The front surface 12 is defined by a conic lateral surface 16 which extends from planar back surface 10 (the base of a right circular cone) for a slant height S to a section plane 18 parallel to planar back surface 10. Accordingly, the front surface 12 is configured as a frustum of a right circular cone over an aft portion.

Conic lateral surface 16 is a surface defined by the movement of a straight line which constantly touches the fixed plane curve of back surface 10 and passes through a fixed point V (the vertex). As shown, the conic surface 16 is part of a right circular cone in which the center of planar back surface 10 (the base) coincides with the foot of the perpendicular 20 dropped from the point V to back surface 10. Conic lateral surface 16 is symmetrical about perpendicular 20 and defines section plane 18 as a circle. A nose portion 22 of surface 12 extends from section plane 18 and is configured as a spherical sector.

Within the described configuration for the aspherical lens of FIG. 1, there are parameters which establish the exact configuration. These parameters include the overall height H, the height H' of the nose portion, the diameter D of the planar back surface, and the angle A between conic lateral surface 16 and perpendicular 20. Overall height H and diameter D of planar back surface 10 will, of course, be dependent upon the size and number of photodetectors being utilized. However, for the other parameters, it is believed preferable to make the height H' of the nose portion approximately 10% of the overall height H. It is also believed preferable to make the angle A between conic lateral surface 16 and perpendicular 20 approximately 30°.

As indicated, the "cone-shaped" lens configuration shown in FIG. 1 is merely a suitable approximation to the idealized shape of a hyperboloid.

To facilitate mounting of the lens, a mounting flange 14 is also provided. Preferably, mounting flange 14 is formed integrally with the lens body.

Figure 2:
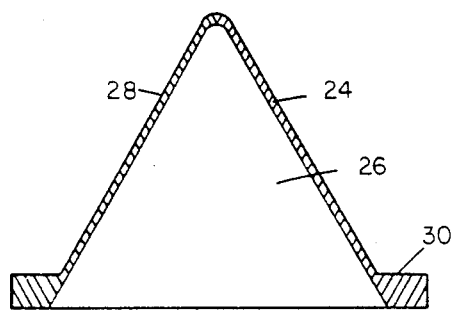
FIG. 2 is a sectioned side view of a lens in accordance with the present invention, in which the lens structure comprises a shell and internal filler material.

A lens in the configuration described in connection with the drawing of FIG. 1 may suitably be cast as a solid body from light transparent material, for example, polycarbonate. Such a lens may also be suitably constructed by molding. In FIG. 2, a molded lens of a shape corresponding to the shape of the lens of FIG. 1 is shown. The lens comprises a shell 24 of light transparent material having an open internal void 26. The exterior surface 28 of the shell is aspherical and defines the front surface portion of the lens. A mounting flange 30 is also provided, the flange preferably being formed integrally with shell 24.

In terms of a manufacturing procedure, the lens of FIG. 2 may be formed by injection molding using Lexan 101 Polycarbonate. Preferably, the shell is one tenth (1/10) of an inch thick. In order to define a planar back surface for the lens of FIG. 2, the internal void 26 of shell 24 is filled with a body of light transparent filler material. Suitably, the shell may be filled with Hysol 0S1000 heat-curing, two-part epoxy. This structure exhibits a refractive index n=1.6.

In reference to the optical signal detection apparatus of FIGS. 3, 4, 5 and 6, the aspherical lens of each is suitably formed either by casting as a solid, or by molding as a shell and filling the void.

Figure 3:
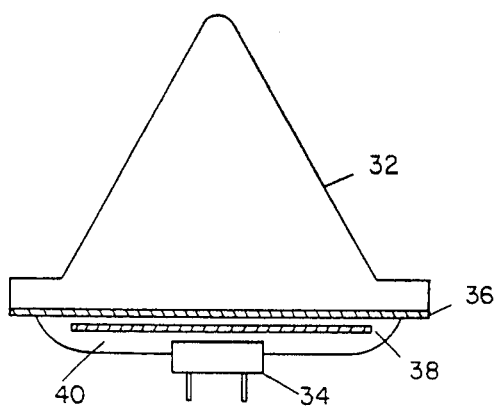
FIG. 3 is a sectioned side view of a first embodiment of optical signal detection apparatus in accordance with the present invention, in which a single photodetector is disposed adjacent the back surface of the lens.
Figure 4:
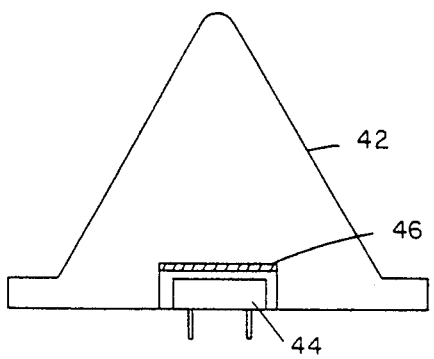
FIG. 4 is a sectioned side view of a second embodiment of optical signal detection apparatus in accordance with the present invention, in which a single photodetector is encapsulated within an aspherical lens.

Referring now to FIGS. 3 and 4, there is shown in each drawing optical signal detection apparatus comprising a single photodetector having a receiving surface sensitive to optical radiation incident thereon, and an aspherical lens for capturing an optical signal of diffuse optical radiation and directing the same onto the photodetector receiving surface. In FIG. 3, the photodetector is disposed externally of the lens, whereas in FIG. 4, the photodetector is encapsulated within the lens.

Referring specifically to FIG. 3, an aspherical lens 32 in accordance with the shape and construction of the lenses in FIGS. 1 and 2 is combined with photodetector 34. In the combination shown, a light transparent, electrically conductive coating 36 is applied to the planar back surface of the lens to provide radio frequency and electro-magnetic interference shielding. An optical filter 38 is disposed adjacent coating 36. Suitably, the optical filter may be glued to the coating. Photodetector 34 may also be attached to optical filter 38 by glueing. A body of epoxy or like encapsulant material surrounds detector 34 and optical filter 38.

Referring now to FIG. 4, an aspherical lens 42 has a photodetector 44 encapsulated therein adjacent to back planar surface. An optical filter is also encapsulated within lens 42 and disposed adjacent the receiving surface of the photodetector. Encapsulation of photodetector 44 and filter 46 may be by insertion of the items into filler material placed in a shell, or by insertion of the elements into a routed opening into the interior of the lens through the back surface.

Figure 5:
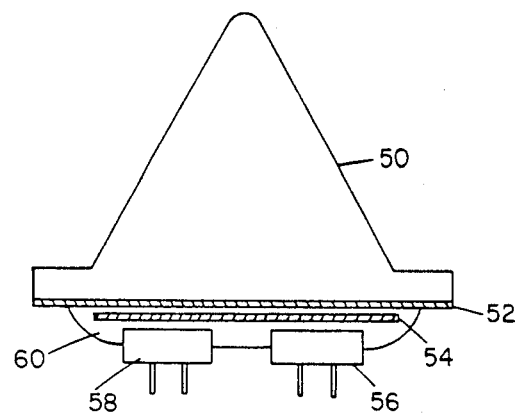
FIG. 5 is another embodiment of optical signal detection apparatus in accordance with the present invention, in which a plurality of photodetectors are utilized.
Figure 6:
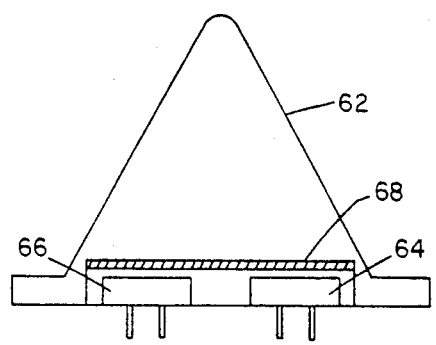
FIG. 6 is yet another embodiment of optical signal detection apparatus in accordance with the present invention, in which a plurality of photodetectors are encapsulated within an aspherical lens.

Referring now to FIGS. 5 and 6, optical signal detection apparatus having a plurality of photodetectors are shown. In FIG. 5, an aspherical lens 50 has a light transparent, electrically conductive coating 52 applied to the back surface thereof. An optical filter 54 is disposed adjacent coating 52, and suitably may be attached thereto by glueing. Disposed immediately behind filter 54 are photodetectors 56 and 58. A body of encapsulant material 60 surrounds the photodetectors and the optical filter.

The apparatus of FIG. 6 includes an aspherical lens 62 having photodetectors 64 and 66 encapsulated therein. An optical filter 68 is also encapsulated within lens 62. Encapsulation of both the detectors and the filter may be by immersion into filler material or by insertion into a routed opening through the planar back surface of the lens. If the filter and detectors are inserted through a routed opening in the planar back surface, an encapsulate material may be required to surround the elements.

The light transparent, electrically conductive coating used in the construction of the apparatus of FIGS. 3 and 5 may suitably be INTREX-G electrically conductive transparent polyester film coated with gold. This material is available from Sierracin/Sylmar, 12780 San Fernando Road, Sylmar, Calif. 91342.

The optical filters are preferably solid and of the gelatin film type. Specifically, a KODAK Wratten Gel Filter No. 87 is preferred.

Where attachment by glueing is indicated, epoxy is preferred. Furthermore, in FIGS. 3 and 5 which indicate an encapsulant material around the photodetectors, epoxy has also been found to be a suitable material.

A suitable photodetector is a BPW34 plastic encapsulated silicon PIN photodiode.

Figure 7:
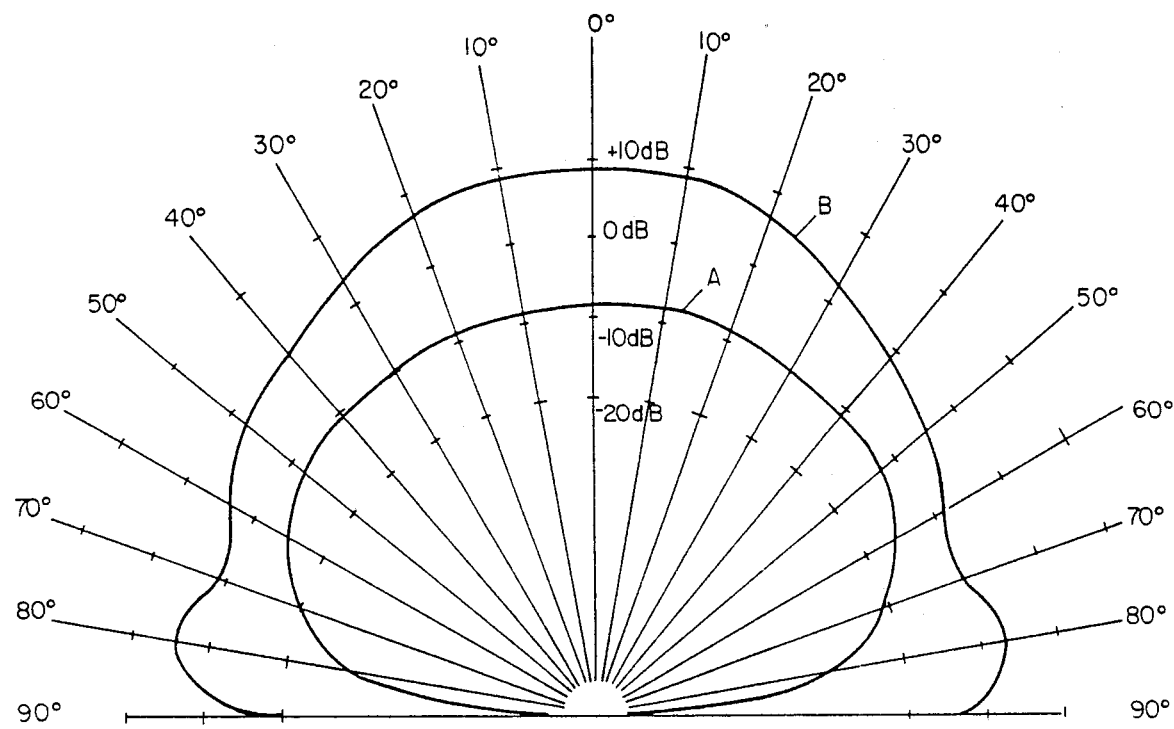
FIG. 7 is a graph of the directional characteristics of a lens in accordance with the teachings of the present invention.

Referring now to FIG. 7, there are presented polar plots of relative optical gain versus angle of light ray incidence for optical signal detection apparatus including a photodetector alone (Plot A), and a photodetector in combination with an aspherical lens configured in accordance with the hyperboloid approximation shown in FIG. 1 (Plot B). The plots were obtained by measurement of photodetector output signal level (in dB's) produced in response to a collimated light source of constant optical power output disposed at various angles relative to the optical axis of the photodetector. Since output signal level is proportional to the optical power of the light incident upon the photodetector, the measurements are representative of relative optical gain.

On the relative gain scale adopted in the graph, Plot A shows the optical gain with no lens to be approximately $-8$ dB at 0° directional angle (i.e., directly on the optical axis of the photodetector device). As indicated in Plot B, at a directional angle of 0°, the photodetector/lens combination shows a relative gain measurement of $+10$ dB. This represents an 18 dB increase in received optical power by the photodetector.

Although falling-off rapidly through the range of directional angles of incidence that includes 30°–60°, the relative gain of a photodetector with the aspherical lens maintains approximately a 10 dB gain advantage over a photodetector without the lens. The aspherical lens then exhibits a marked increase in optical gain for extremely wide angles of light ray incidence. As indicated in Plot B, for angles greater than 60°, and up to about 80°, optical gain increases significantly. For example, at an angle of incidence of 80°, the relative gain with the lens is approximately 25 dB greater than the gain without the lens.

The gain plots of FIG. 7 indicate that an aspherical lens will increase the optical gain of optical signal detection apparatus for diffuse optical signals by increasing the concentration of the optical radiation flux on the receiving surface of the photodetector, especially at very wide angles of light ray incidence. The large gain at the very wide angles, where a photodetector alone has almost no response, is believed to be due to internal reflection of light rays at the wide angles.

With optical signal detection apparatus employing an aspherical lens, there is also realized an improvement in signal-to-noise ratio. This is proven out both theoretically and experimentally. For example, it can be shown that material of refractive index, n, will concentrate diffuse light incident thereon, and that the concentration, C, is:

$$C \leq n^2/\sin^2\theta_{max},$$

where $\theta$ max is the light acceptance angle. See Ari Rabl, "Comparison of Solar Concentrators", *Solar Energy*, Vol. 18, 1976.

Considering photodiode current to be directly proportional to the amount of diffuse optical power incident on the diode receiving surface, the electrical signal gain expressed in decibels is 20 log (C), or 20 log (2.56), which is approximately 8 dB. This is the signal gain, Gs.

Photodetector noise is "shot-noise" of the form: $\sqrt{2e\,BW\,I}$, where e is the electron charge, BW is the detector bandwidth, and I is the detector current. Since electron charge and detector bandwidth are constants, shot noise is essentially proportional to $\sqrt{I}$. For a concentration gain of C=2.56, therefore, the increase in shot-noise is $\sqrt{2.56}=1.6$. Thus, the noise gain, Gn, is 20 log (1.6), which is approximately 4 dB.

The theoretical signal-to-noise ratio improvement is:

$$Gs/Gn = 20 \log 2.56/1.60 = 4 \text{ dB}.$$

Experimentally, the signal-to-noise ratio has been found to improve by 3 dB.

In use, the optical signal detection apparatus embodied in any one of the forms depicted in FIGS. 3–6, or an equivalent form, is operational to detect an infrared light wave communication signal emitted from an infrared radiation source which is one part of a diffuse optical channel. An infrared communication signal typically embodies information (voice or data) in intensity modulations of the infrared radiation emitted by the source. Some of the emitted infrared radiation comprising the communication signal is directly incident on the front surface of the aspherical lens; however, much of the light is reflected by the boundary surfaces of a room enclosure, and by objects in the room. Some of the reflected radiation will be incident on the front surface of the aspherical lens, but will be arriving at various angles of incidence. Infrared radiation incident on the front surface of the aspherical lens is refracted to the inside, except for some amount of light reflected off the front surface, which is lost. Refracted infrared radiation propagates through the lens body and passes through the optical filter which removes light of unwanted wavelengths. The infrared radiation signal also passes through the clear conductive coating. Some light is lost by reflections off the coating, but essentially all radio frequency and electromagnetic interference noise is rejected. The infrared radiation signal then becomes incident upon the receiving surface of a photodetector and is converted to an electrical signal. The signal produced then goes to appropriate amplification and signal processing circuits for recovery of the information contained in the electrical signal.

The foregoing description of the invention has been directed to particular preferred embodiments for purposes of explanation and illustration. It will be apparent, however, to those skilled in this art that many modifications and changes may be made without departing from the scope and spirit of the invention. For example, in the optical signal detection apparatus, an optical filter may be included as a part of the photodetector itself. Also, the front surface of the lens may be configured in many aspherical shapes other than a hyperboloid, or the disclosed approximation to a hyperboloid. Specifically with respect to the disclosed "conic" approximation to a hyperboloid, the nose portion 22 may be other than a spherical sector, for example, a paraboloid or ellipsoid. Yet further, a clear conductive coating may be applied on the front surface of the lens either in addition to or in lieu of a coating applied on the back surface of the lens. These, and other modifications of the invention will be apparent to those skilled in this art, and it is the applicant's intention in the following claims to cover all such equivalent modifications and variations as fall within the scope of the invention.

What is claimed is:

1. A lens for concentrating diffuse light which comprises:

a body of light transparent material, said body having -
   (a) a planar back surface; and
   (b) a front surface projecting from the plane of the back surface, for refracting diffuse light impinging thereon toward the planar back surface, said front surface projecting a predetermined height above the planar back surface;
   (c) the front surface being configured as a frustum of a right circular cone over an aft portion, and being configured as a spherical sector over a nose portion, said nose portion being of a height that is approximately 10% of the predetermined height of the front surface.

2. Optical signal detection apparatus, which comprises:

a photodetector having a receiving surface sensitive to optical radiation incident thereon; and a lens for capturing an optical signal of diffuse optical radiation and concentrating the same onto said photodetector receiving surface, said lens having a planar back surface, and having a front surface configured as a frustum of a right circular cone over an aft portion and being configured as a spherical sector over a nose portion;

a light transparent, electrically conductive coating applied to said planar back surface; and an optical filter disposed between the lens and the receiving surface of the photodetector.

3. Optical signal detection apparatus, which comprises:

a photodetector having a receiving surface sensitive to optical radiation incident thereon;

an aspherical lens for capturing an optical signal of diffuse optical radiation and concentrating the same onto said photodetector receiving surface;

said lens being configured to have a planar back surface and an aspherical front surface; and a light transparent, electrically conductive coating applied to the planar back surface of the lens.

4. The apparatus of claim 3 which further comprises:

an optical filter disposed between the lens electrically conductive coating and the receiving surface of the photodetector.

* * * * *